(12) United States Patent
Bikumala et al.

(10) Patent No.: US 10,289,522 B2
(45) Date of Patent: May 14, 2019

(54) AUTONOMOUS INFORMATION TECHNOLOGY DIAGNOSTIC CHECKS

(71) Applicant: DELL PRODUCTS, LP, Round Rock, TX (US)

(72) Inventors: Sathish Bikumala, Round Rock, TX (US); Carlos Lourenco Machado, Porto Alegre (BR)

(73) Assignee: Dell Products, LP, Round Rock, TX (US)

(*) Notice: Subject to any disclaimer, the term of this patent is extended or adjusted under 35 U.S.C. 154(b) by 97 days.

(21) Appl. No.: 15/481,035

(22) Filed: Apr. 6, 2017

(65) Prior Publication Data

US 2018/0293147 A1 Oct. 11, 2018

(51) Int. Cl.
*G06F 19/00* (2018.01)
*G06F 11/34* (2006.01)
*G06N 20/00* (2019.01)

(52) U.S. Cl.
CPC ......... *G06F 11/3476* (2013.01); *G06N 20/00* (2019.01)

(58) Field of Classification Search
CPC ......... F23C 1/00; F24D 13/00; F24D 19/1084
USPC ........................................ 702/186, 182–185
See application file for complete search history.

(56) References Cited

U.S. PATENT DOCUMENTS

| 64,497,369 | | 9/2002 | Landan |
| 7,401,143 | B2 | 7/2008 | Oulu et al. |
| 10,003,665 | B2* | 6/2018 | Stenneth .................. H04Q 9/00 |
| 2006/0053094 | A1 | 3/2006 | Ravi et al. |

* cited by examiner

*Primary Examiner* — Edward Raymond
(74) *Attorney, Agent, or Firm* — Larson Newman, LLP

(57) ABSTRACT

A rules-based engine uses artificial intelligence to perform an automated diagnostic check of a computer chassis. The rules-based engine consults a dynamically-changing dependency map to determine what diagnostic data is retrieved. The rules-based engine also monitors a database of events to determine when the diagnostic data is retrieved. A baseboard management controller may then execute a diagnostic algorithm that conducts the automated diagnostic check according to the dependency map and the database of events. Exemplary embodiments thus offer a machine learning, artificial intelligence scheme for autonomously performed diagnostic testing of processor, memory, software, and networking functions.

20 Claims, 15 Drawing Sheets

AUTONOMOUS INFORMATION TECHNOLOGY DIAGNOSTIC CHECKS

FIELD OF THE DISCLOSURE

The present disclosure generally relates to information handling systems, and more particularly relates to self-triggering, chassis-based diagnostic health checks of hardware, software, and networking capabilities.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Networks and devices are often too complex to diagnose easily. A typical business network may connect hundreds of diverse devices of different manufactures, different types, and different configurations. Even residential networks connect many diverse devices. Should any networked device develop a problem, diagnosis and repair may be difficult.

Exemplary embodiments provide a rules-based engine that performs an automated diagnostic check of a computer chassis. The rules-based engine consults a dynamically-changing dependency map to determine what information systems and infrastructure on which the diagnostic check is performed. The rules-based engine also monitors a database of events to determine when the diagnostic data is retrieved. A baseboard management controller may then execute a diagnostic algorithm that conducts the automated diagnostic check according to the dependency map and the database of events. Exemplary embodiments thus offer a machine learning, artificial intelligence scheme for autonomously performed diagnostic testing of processor, memory, software, and networking functions.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
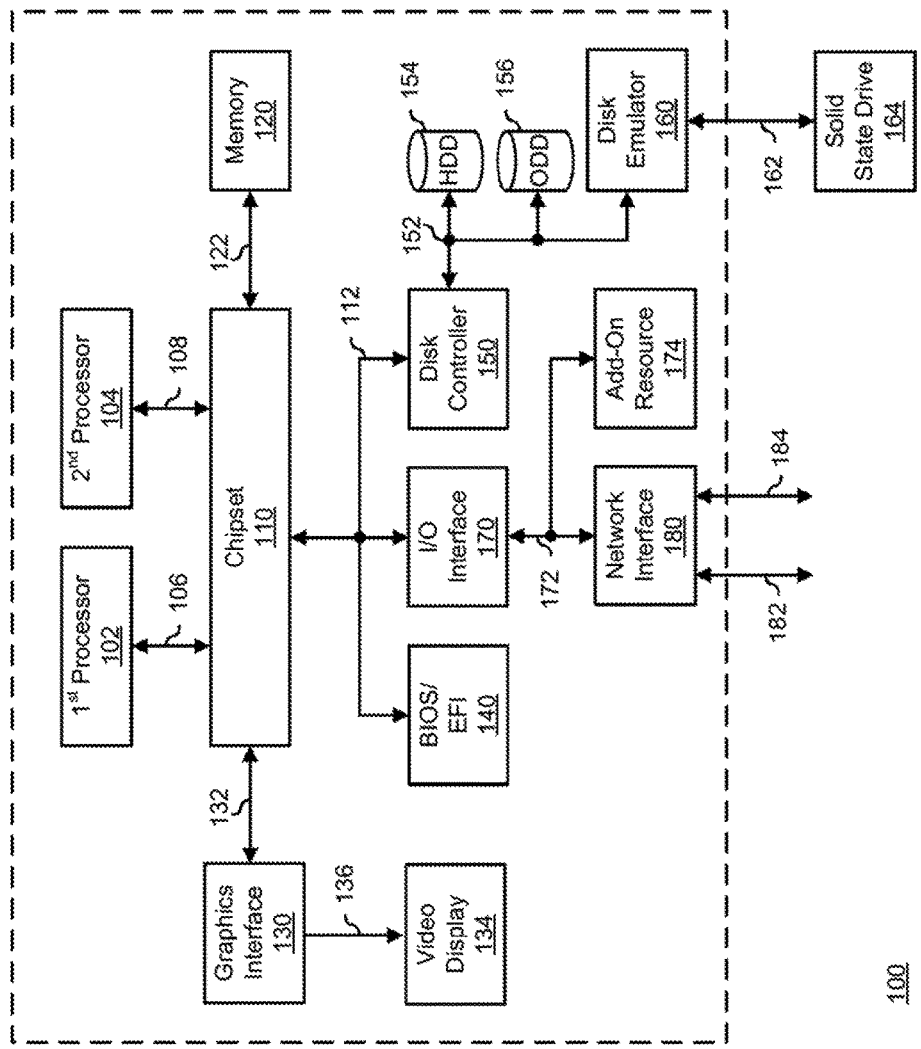
FIG. 1 is a block diagram illustrating an information handling system according to an embodiment of the present disclosure.

FIG. 1 illustrates a generalized embodiment of an information handling system (IHS) 100, according to exemplary embodiments. For purpose of this disclosure the IHS 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the IHS 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, the IHS 100 can include processing resources for executing machine-executable code, such as a central processing unit (CPU), a programmable logic array (PLA), an embedded device such as a System-on-a-Chip (SoC), or other control logic hardware. The IHS 100 can also include one or more computer-readable medium for storing machine-executable code, such as software or data. Additional components of the IHS 100 can include one or more storage devices that can store machine-executable code, one or more communications ports for communicating with external devices, and various input and output (I/O) devices, such as a keyboard, a mouse, and a video display. The IHS 100 can also include one or more buses operable to transmit information between the various hardware components.

The IHS 100 can include devices or modules that embody one or more of the devices or modules described above, and operates to perform one or more of the methods described above. The IHS 100 includes one or more processors (such as reference numerals 102 and 104), a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, the IHS 100 includes separate memories that are dedicated to each of the processors 102 and 104 via separate memory interfaces. An example of the memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within IHS 100, to provide drivers for the resources, initialize the resources, and access the resources.

Disk controller 150 includes a disk interface 152 that connects the disk controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to IHS 100 via an external interface 162. An example of external interface 162 includes a USB interface, an IEEE 1194 (Firewire) interface, a proprietary interface, or a combination thereof. Alternatively, solid-state drive 164 can be disposed within IHS 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within IHS 100, a device that is external to the information handling system, or a combination thereof.

Network interface 180 represents a NIC disposed within the IHS 100, on a main circuit board of the IHS 100, integrated onto another component such as chipset 110, in another suitable location, or a combination thereof. Network interface device 180 includes network channels 182 and 184 that provide interfaces to devices that are external to IHS 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
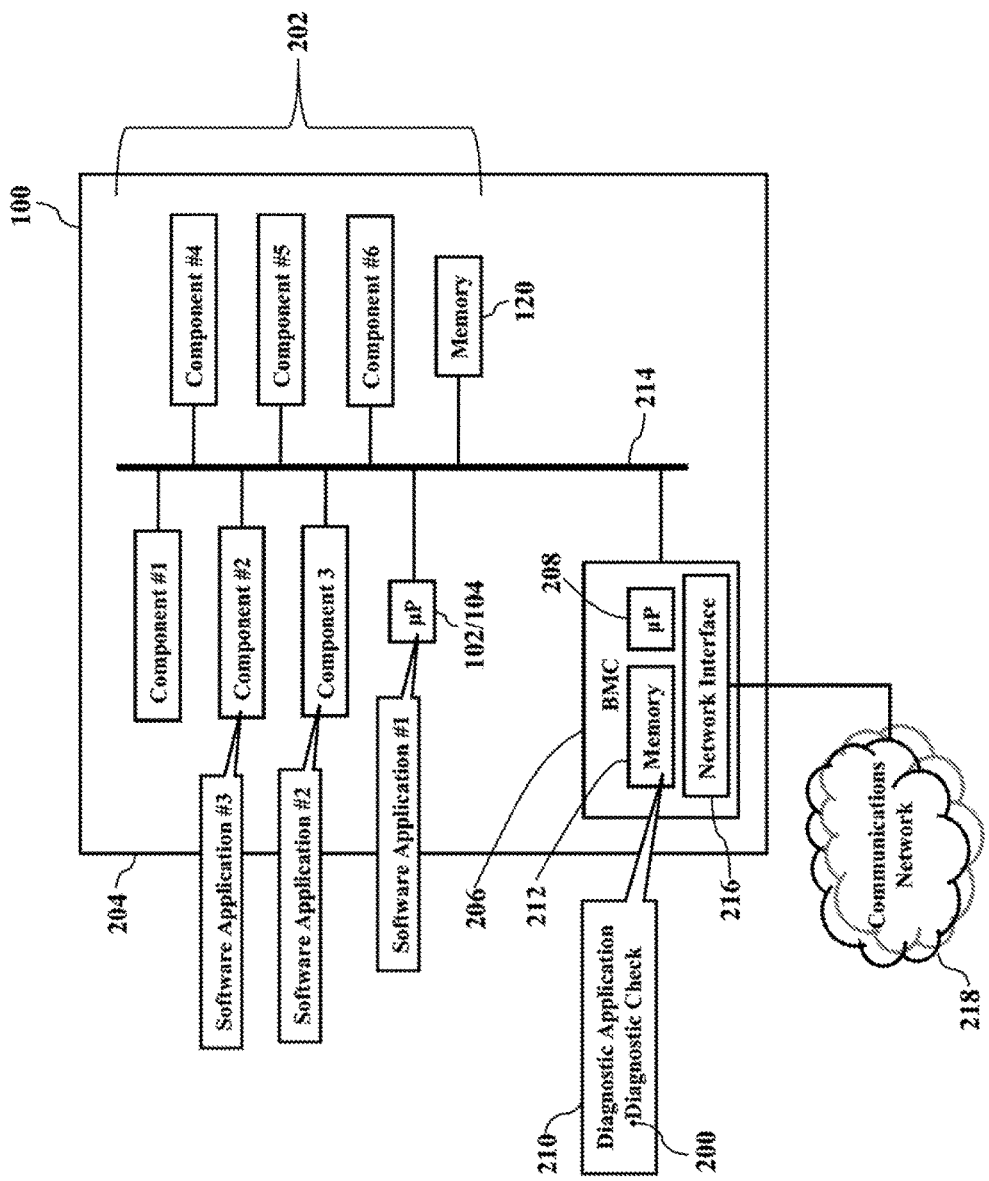
FIGS. 2-4 are block diagrams illustrating a diagnostic check, according to exemplary embodiments.
Figure 3:
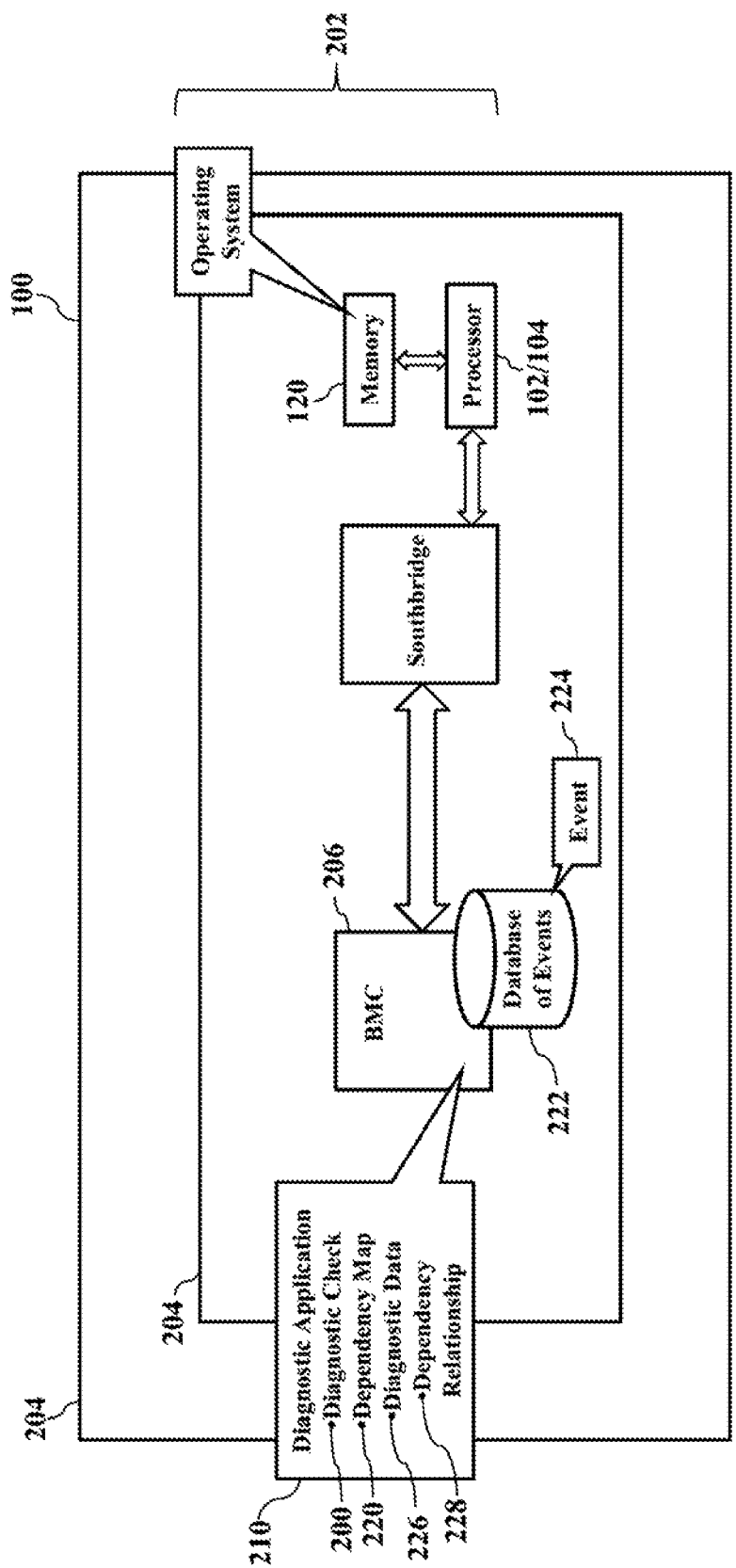
Figure 4:
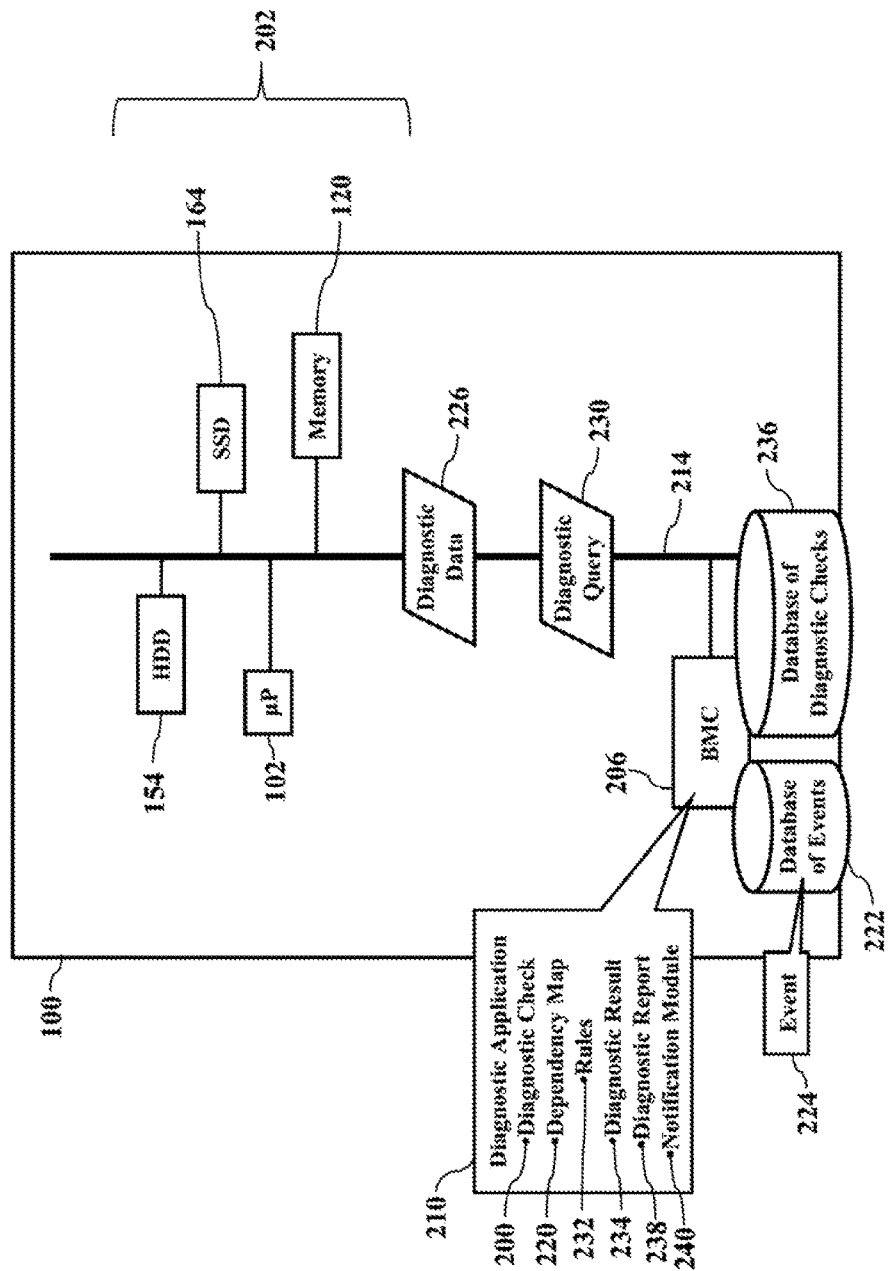

FIGS. 2-4 are block diagrams illustrating a diagnostic check 200, according to exemplary embodiments. Here the IHS 100 autonomously performs the diagnostic check 200 of its internal hardware and/or software components 202 operating within its chassis 204. That is, the IHS 100 executes an artificial intelligence scheme for autonomously performing diagnostic testing of hardware components and software functions. The IHS 100 may have a separate, internal baseboard management controller (BMC) 206 that performs the diagnostic check 200. For example, the baseboard management controller 206 has a dedicated processor 208 that may execute a diagnostic application 210 stored in an internal memory device 212. The diagnostic application 210 causes the baseboard management controller 206 to query the internal hardware and/or software components 202 to conduct the diagnostic check 200. While exemplary embodiments may use any communications mechanism, FIG. 2 illustrates a local bus 214 coupling the baseboard management controller 206 to the internal hardware and/or software components 202 via a networking interface (such as PCI, PCI-X, PCIe, $I^2C$, or USB). The baseboard management controller 206 may also have a dedicated network interface 216 to a communications network 218, thus allowing the baseboard management controller 206 to be remotely diagnosed or to conduct remote information retrieval.

FIG. 3 further illustrates the diagnostic check 200. Here the diagnostic application 210 includes code or instructions that cause the baseboard management controller 206 to consult a dependency map 220 and a database 222 of events to conduct the diagnostic check 200. In simple words, the dependency map 220 determines which of the internal hardware and/or software components 202 (operating within the chassis 204) is diagnosed during the diagnostic check 200. The database 222 of events determines when the diagnostic check 200 is performed. The diagnostic application 210 continuously monitors the database 222 of events to determine when any event 224 triggers the diagnostic check 200. When the diagnostic check 200 is executed according to the event 224, the diagnostic application 210 queries the dependency map 220 for the freshest or most recent diagnostic data 226 to perform the diagnostic check 200. Moreover, the dependency map 220 may also define or specify a dependency relationship 228 between different components and software, which later paragraphs will explain. The diagnostic application 210 thus executes the diagnostic check 200 based on the event 224 and the diagnostic data 226 retrieved from the dependency map 220.

The diagnostic check 200 may trigger or execute in response to the event 224. For example, if any of the internal hardware and/or software components 202 experiences a problem, error, or alert, the diagnostic data 226 may trigger the event 224. The diagnostic data 226 may thus represents any data, information, or message worthy of threshold alerting. The diagnostic data 226 may exceed some threshold comparison (such as temperature, value, or time). The event 224, however, may also be based on other information, such as weather and calendar events, as later paragraphs will explain.

The baseboard management controller 206 thus performs diagnostic testing. The baseboard management controller 206 allows remote management and testing of the internal hardware and/or software components 202. For example, the baseboard management controller 206 may utilize the Intelligent Platform Management Interface (IPMI) specification. That is, the IHS 100 has a motherboard comprising the chipset 110 (illustrated in FIG. 1). However, the IHS 100 may also have the separate baseboard management controller 206. As those of ordinary skill in the art understand, the baseboard management controller 206 interfaces with the motherboard to provide side-band and out-of-band remote management of the IHS 100. The baseboard management controller 206 has one or more physical communications links and interfaces to the motherboard, thus allowing the baseboard management controller 206 to process messages according to the IPMI specification. The baseboard management controller 206 may thus monitor and report the functions and performance of the IHS 100 via the separate network interface 216 to the communications network 218. The IPMI specification is generally well known and thus need not be explained in detail. The baseboard management controller 206 may thus inventory or survey the internal hardware and/or software components 202 to conduct the diagnostic check 200.

FIG. 4 further illustrates the diagnostic check 200. The diagnostic application 210 sends a diagnostic query 230 to the internal hardware and/or software components 202. While the diagnostic query 230 may utilize any communications standard or mechanism, FIG. 4, for simplicity, again illustrates the local bus 214. The internal hardware and/or software component(s) 202 respond(s) with the diagnostic data 226. The diagnostic application 210 may then populate the dependency map 220 with the diagnostic data 226. The diagnostic application 210 may thus execute and/or evaluate one or more rules 232 that specify when the event 224 is satisfied and which of the diagnostic data 226 in the dependency map 220 is used to conduct the diagnostic check 200. The rules 232 may thus be logical statements that specify parameter values defining the event 224 and/or the diagnostic data 226. The diagnostic application 210 may thus retrieve and execute the rule(s) 232 to generate a diagnostic result 234 of the diagnostic check 200. The diagnostic application 210 may then store the diagnostic result 234 in a database 236 of diagnostic checks. The database 236 of diagnostic checks may thus be a log or repository for different diagnostic checks 200, perhaps according to a date and time of execution. The diagnostic application 210 may also generate a diagnostic report 238 that explains or summarizes the diagnostic check 200. Moreover, a notification module 240 provides local and/or remote notifications capabilities. Exemplary embodiments may thus send or publish the diagnostic report 238 of the diagnostic check 200 to any network destination (such as an Internet Protocol address) as a message, email, document, short message service text, or webpage/website.

Exemplary embodiments thus present an elegant solution. Conventional diagnostic solutions require human/user intervention. That is, conventional diagnostic testing must be configured by the user, or the user must monitor system generated events. Exemplary embodiments, instead, provide a fully automated solution that executes the rules 232 to create dependencies via machine learning and to automatically trigger the diagnostic check 200 without human intervention. Exemplary embodiments thus provide a more secure, complete, consistent, and error-free comprehensive diagnostic check 200 to any infrastructure having network access.

Figure 5:
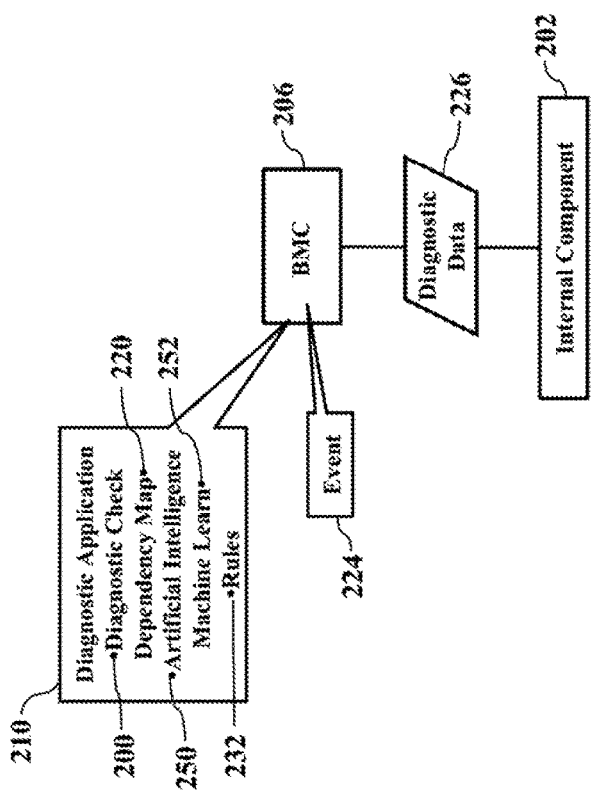
FIGS. 5-7 illustrate a dependency map, according to exemplary embodiments.
Figure 6:
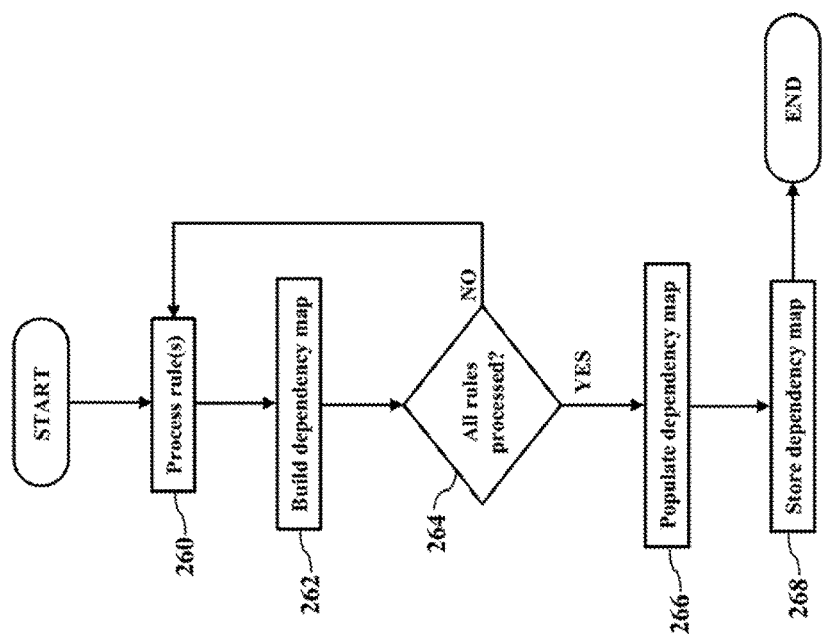
Figure 7:
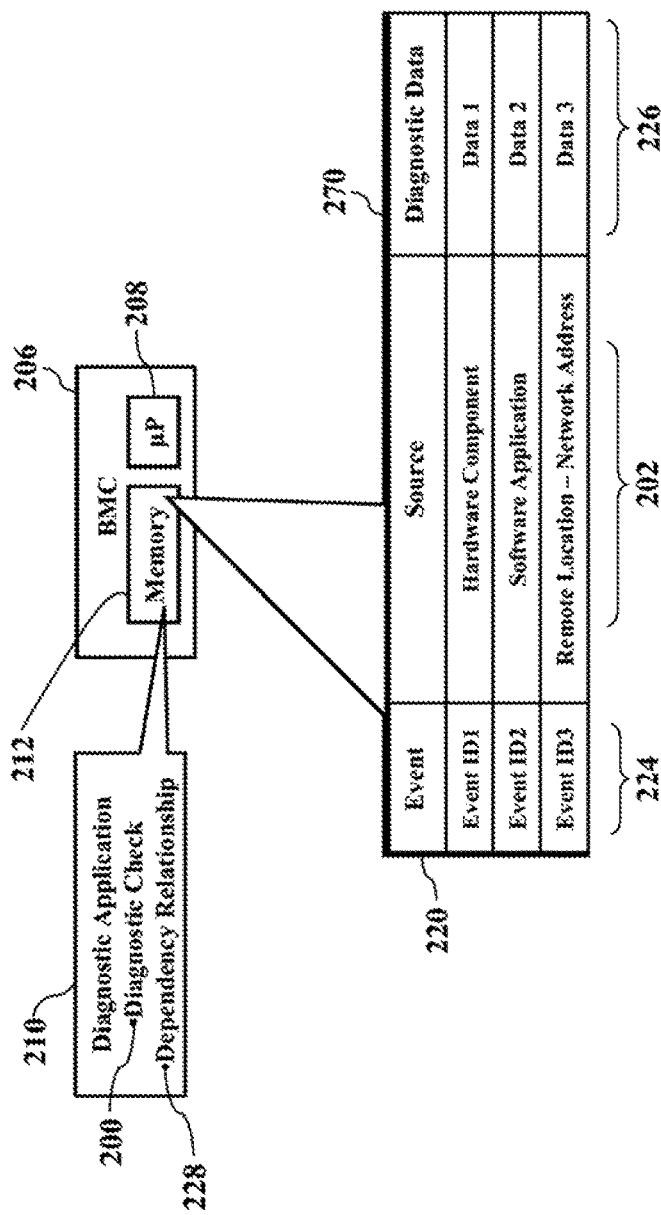
Figure 8:
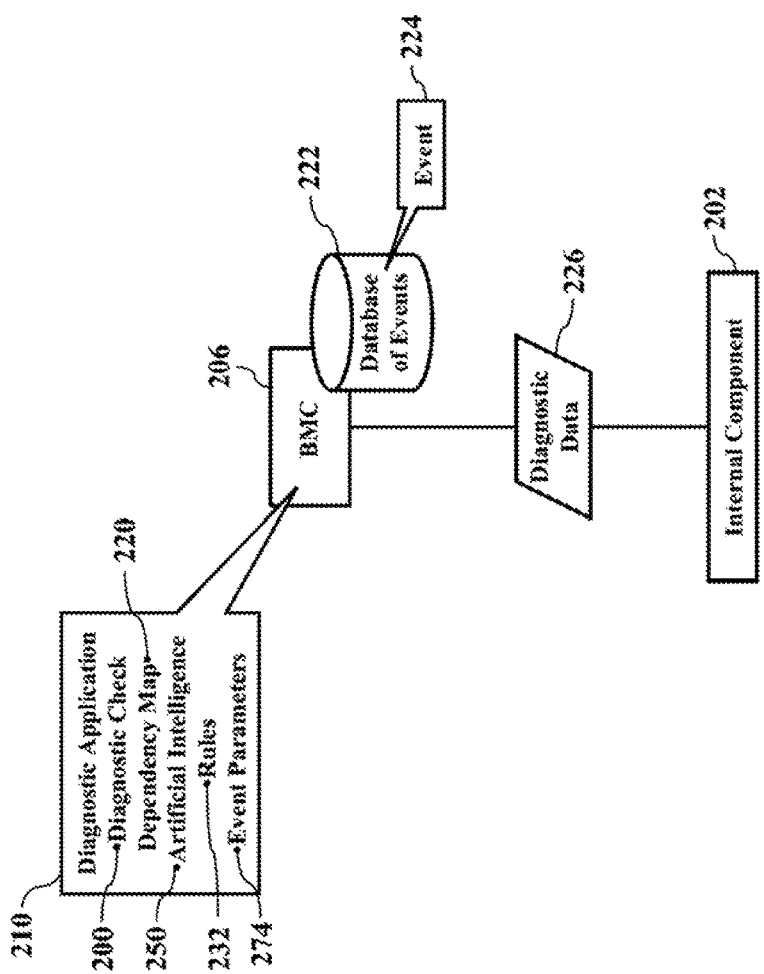
FIGS. 8-12 illustrate event processing, according to exemplary embodiments.

FIGS. 5-7 further illustrate the dependency map 220, according to exemplary embodiments. Here exemplary embodiments may self-create the dependency map 220 using artificial intelligence 250. That is, the diagnostic application 210 executes logical programming that causes the baseboard management controller 206 to machine learn 252 which of the internal hardware and/or software component(s) 202 is diagnosed during the diagnostic check 200. The artificial intelligence 250 that enables the machine learn 252 may be expressed as the rules 232 that specify retrieval of the diagnostic data 226 for the diagnostic check 200. The rules 232, for example, may instruct the baseboard management controller 206 to query the dependency map 220 in response to the event 224 and to retrieve the diagnostic data 226 to conduct the diagnostic check 200.

FIG. 6 illustrates a logical flowchart for creating the dependency map 220. The dependency map 220 defines logical dependencies between the rules 232, the internal hardware and/or software component(s) 202, and the diagnostic data 226. The rules 232 are sequentially, parallel, or batch processed (Block 260) to build the dependency map 220 that specifies the relations and/or dependencies of systems and components (Block 262). The rule 232 thus specifies which internal hardware and/or software component 202 is queried for the diagnostic data 226. If one or more rules 232 remain to be processed (Block 264), exemplary embodiments may continue processing the rules 232 to retrieve the most recent diagnostic data 226. However, if all the rules 232 have been processed (Block 264), the dependency map 220 is updated to reflect retrieval of the latest or freshest diagnostic data 226 (Block 266). The dependency map 220 is then stored (Block 268) (perhaps in the internal memory device 212 of the baseboard management controller 206 and/or in the memory 120 associated with the service processors 102/104, as illustrated in FIGS. 1 and 2).

FIG. 7 further illustrates the dependency map 220. While the dependency map 220 may have any structure, FIG. 7 illustrates the dependency map 220 as a table 270 that electronically maps, relates, or associates different events 224 to their corresponding source 202 and to their corresponding diagnostic data 226. Each event 224, in other words, is mapped to the internal hardware and/or software component 202 that provides the diagnostic data 226. The internal hardware and/or software component 202 may be uniquely referenced using a device identifier (such as peripheral component interface identifier), network address, or application identifier. The source 202, in other words, specifies the retrieval location of the corresponding diagnostic data 226. The diagnostic application 210 may query the dependency map 220 for any query term and identify or even retrieve the corresponding entry. For example, when the event 224 triggers, the diagnostic application 210 may query the dependency map 220 for the event 224 (such as an event identifier or Event ID). If a match is determined, exemplary embodiments may identify or even retrieve the corresponding diagnostic data 226. FIG. 7 illustrates the dependency map 220 as being locally stored in the baseboard management controller 206, but some or all of the entries may be dispersed to multiple other devices or locations in the communications network 218 (illustrated in FIG. 1). While FIG. 7 only illustrates a few entries, in practice the dependency map 220 may contain hundreds, thousands, or even millions of entries detailing many events 224. Whatever the construction or form of the dependency map 220, the dependency map 220 may thus persist over time. Exemplary embodiments capture the diagnostic data 226 and monitor changes in relationships between the rules 232, the source 202, and/or the diagnostic data 226.

The dependency map 220 may also include the dependency relationships 228. The entries in the dependency map 220 may include logical statements specifying a relationship between different events 224, different sources 202, and/or different diagnostic data 226. One data entry, in other words, may link or affect another data entry. These electronic data entries may be stored in one or more configuration management databases (CMDB). However, the conventional CMDB infrastructure is often not up-to-date, as the relationships are not dynamically updated as changes occur. The conventional CMDB infrastructure may thus lead to inconsistency and to decommissioning, causing revenue loss. Dependencies may also be maintained in Change Request (CRQ) systems. When application teams are pushing code changes to production, they electronically document a CRQ. When code changes are pushed, the code changes are pushed in parallel in all the dependent systems at the same time to prevent out-of-synch code issues. Exemplary embodiments may thus capture the relations/dependencies documented or specified by electronic data describing CRQ. Dependencies may also be maintained in problem investigation (PBI) data that is generated when problems are investigated (perhaps resulting in reduced production or yield). The PBI data captures essential information such as the system identifiers experiencing the problem.

The dependency map 220 may thus query various systems to retrieve information from which dependencies may be documented or even generated. Exemplary embodiments may thus periodically query CMDB, CRQ, and PBI databases to automatically retrieve updated dependencies and relationships on a regular basis. This perhaps constant querying for relations can be triggered by the system clock scheduling at various times of the day.

The diagnostic data 226 may describe any normal or abnormal condition. The diagnostic data 226 may describe any information associated with the internal hardware and/or software component 202. For example, the diagnostic data 226 may include a chassis address, a component identifier, a component name, a component model, a service tag number, a network connection status, network connection type (such as PCI), and perhaps port status. Moreover, the diagnostic data 226 may also describe any errors, conditions, or even normal operation. If the internal hardware and/or software component 202 has nothing to report (such as no faults or codes), then perhaps the diagnostic data 226 indicates a normal operation. However, if a problem is detected, the diagnostic data 226 may also include an alert description, such as an error or fault code and a corresponding textual description.

FIGS. 8-12 illustrate event processing, according to exemplary embodiments. As the diagnostic application 210 executes the rules 232 as the artificial intelligence 250, exemplary embodiments may continuously, periodically, or randomly monitor the database 222 of events to determine when the diagnostic check 200 is performed. That is, because the rules 232 may be continuously updated, the event 224 triggers the diagnostic check 200. The rules 232 and/or the events 224 may thus be associated one or more event parameters 274. The event parameters 274 may thus be data or information that are input into, or processed by, the rules 232 to generate and update the event 224. For example, the event 224 may be defined by an incident, error, or other status report generated by the baseboard management controller 206 and/or the internal hardware and/or software component 202. That is, whenever exemplary embodiments receive notice of a problem or out-of-specification/high value, that notice may trigger the event 224 that executes the diagnostic check 200. Indeed, a critical incident or "ticket" may execute the diagnostic check 200. Whatever the event 224, the event 224 is persistently stored in the database 222 of events.

Figure 9:
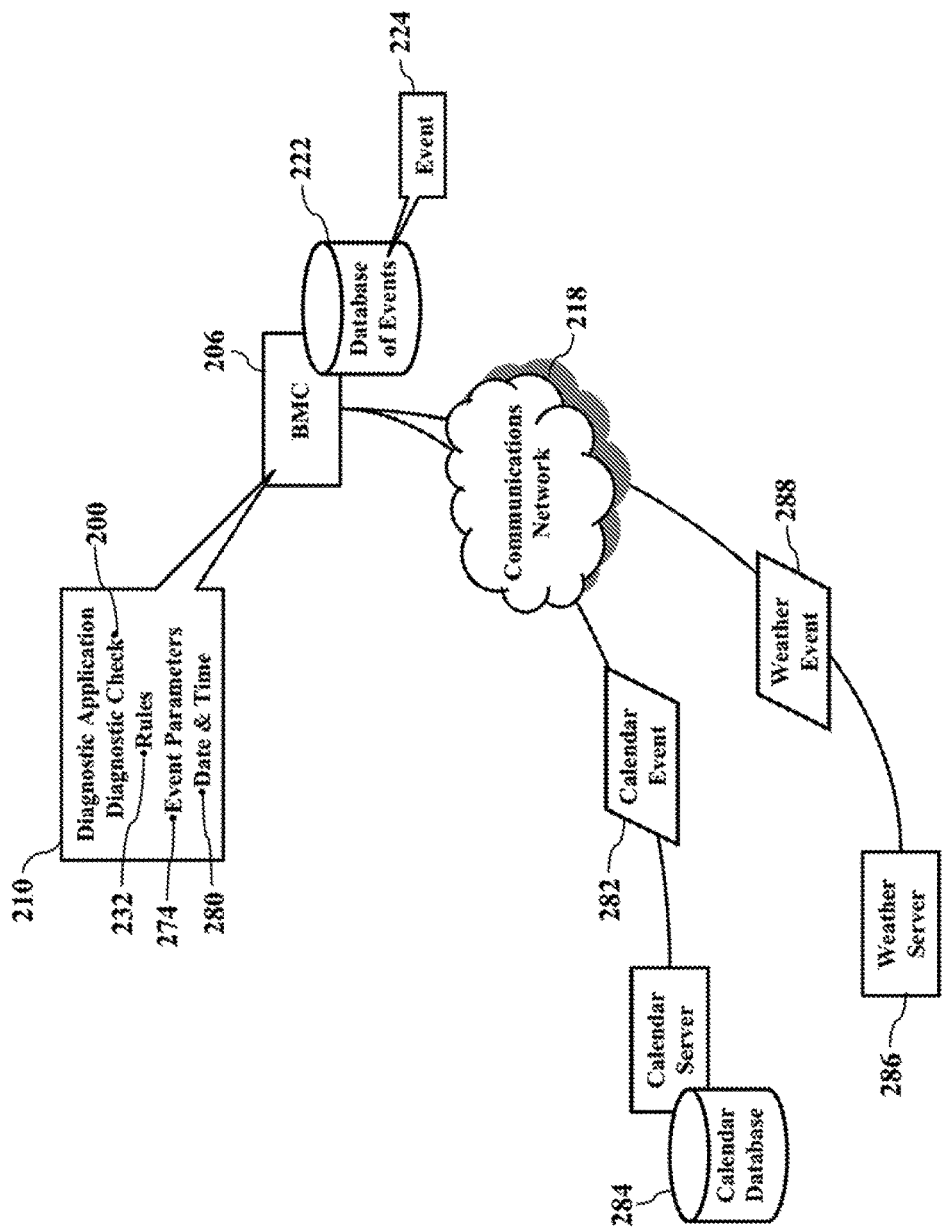

FIG. 9 illustrates examples of the event parameters 274. For example, the event 224 may be based on a date and time 280. The event parameter 274, for example, may specify or be based on a calendar event 282. For example, a change request scheduled at the date and time 280 (perhaps being deployed by the baseboard management controller 206 and/or the service processors 102/104) may trigger execution of the diagnostic check 200. The calendar event 224 may be sourced, sent, or retrieved from a calendar database 284 (locally stored or accessible via the communications network 218). When a current date and time matches the date and time 280 specified by the calendar event 224, exemplary embodiments may trigger the diagnostic check 200 (such as a fiscal calendar or end of quarter date). The event parameter 274 may also specify other advantageous dates and times for executing the diagnostic check 200, such as when component usage or network traffic is low (perhaps during historical off or downtime hours, shift change, weekends, and holidays). The calendar event 224 may also be timed to coincide with promotional events, such as a corporate sales calendar, random promotions, and free student products. The calendar event 224 may also be timed to coincide with scheduled events, such as equipment downtime, maintenance, and periods of work stoppage (such as equipment changeover, training classes, labor strikes, plant shutdown).

FIG. 9 also illustrates weather-based testing. That is, the diagnostic check 200 may also be triggered by weather. Exemplary embodiments may interface with a weather server 286 (perhaps via the communications network 218) that sources or sends weather information describing or alerting of a weather event 288. The diagnostic application 210 executes the rule(s) 232 that is associated with the weather event 288 to dynamically trigger the diagnostic check 200. In some cases, for example, exemplary embodiments may execute the diagnostic check 200 when weather is predicted to be calm or otherwise uneventful. However, in other cases, exemplary embodiments may execute the diagnostic check 200 when a storm or other weather-related event is predicted or warned (perhaps indicating a possible electrical power outage).

Figure 10:
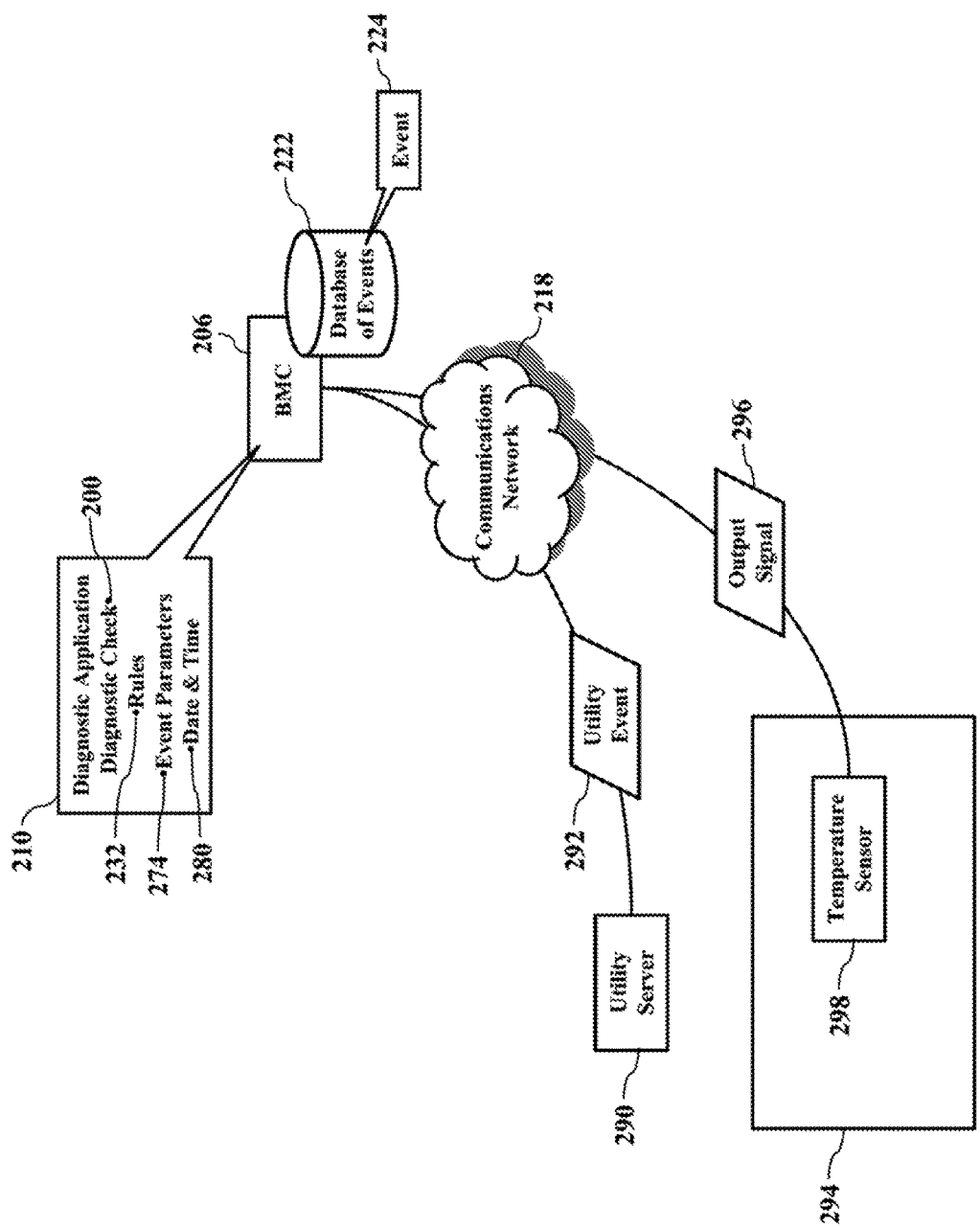

FIG. 10 illustrates additional diagnostic considerations. Here the diagnostic check 200 may also be triggered by a utility provider. Exemplary embodiments may interface with utility server 290 and receive a utility event 292. The utility event 224 may describe data or information related to electrical power, water, wireless/wired communications, or other service. Suppose, for example, that some aspect of the diagnostic check 200 is best performed prior to, or even during, a service outage. When the utility event 224 provides advance notification of a planned or predicted outage, the rules 232 defining the event 224 may trigger the diagnostic check 200.

The diagnostic check 200 may also be triggered by ambient conditions in a data center 294. As the reader may understand, the data center 294 may have hundreds or even thousands of servers generating much heat and consuming much electrical power. The diagnostic application 210 may receive an output signal 296 generated by a temperature sensor 298. The output signal 296 represents an ambient temperature sensed within a server and/or the data center 294. Regardless, the rules 232 defining the event 224 may trigger the diagnostic check 200 based on the output signal 296 generated by the temperature sensor 298. The diagnostic check 200, in plain words, may be conducted when the server and/or the data center 294 runs "hot" or when an HVAC system is not performing as expected.

The diagnostic check 200 may also be triggered by other information. As this disclosure previously explained, exemplary embodiments may periodically query CMDB, CRQ, and PBI databases to automatically retrieve updated dependencies and relationships on a regular basis. Moreover, information technology service management (ITSM) may yield other dependencies and relationships, perhaps as directed by policies (organized and structured in processes and supporting procedures) that are performed by an organization to plan, design, deliver, operate and control information technology (IT) services offered to customers.

Figure 11:
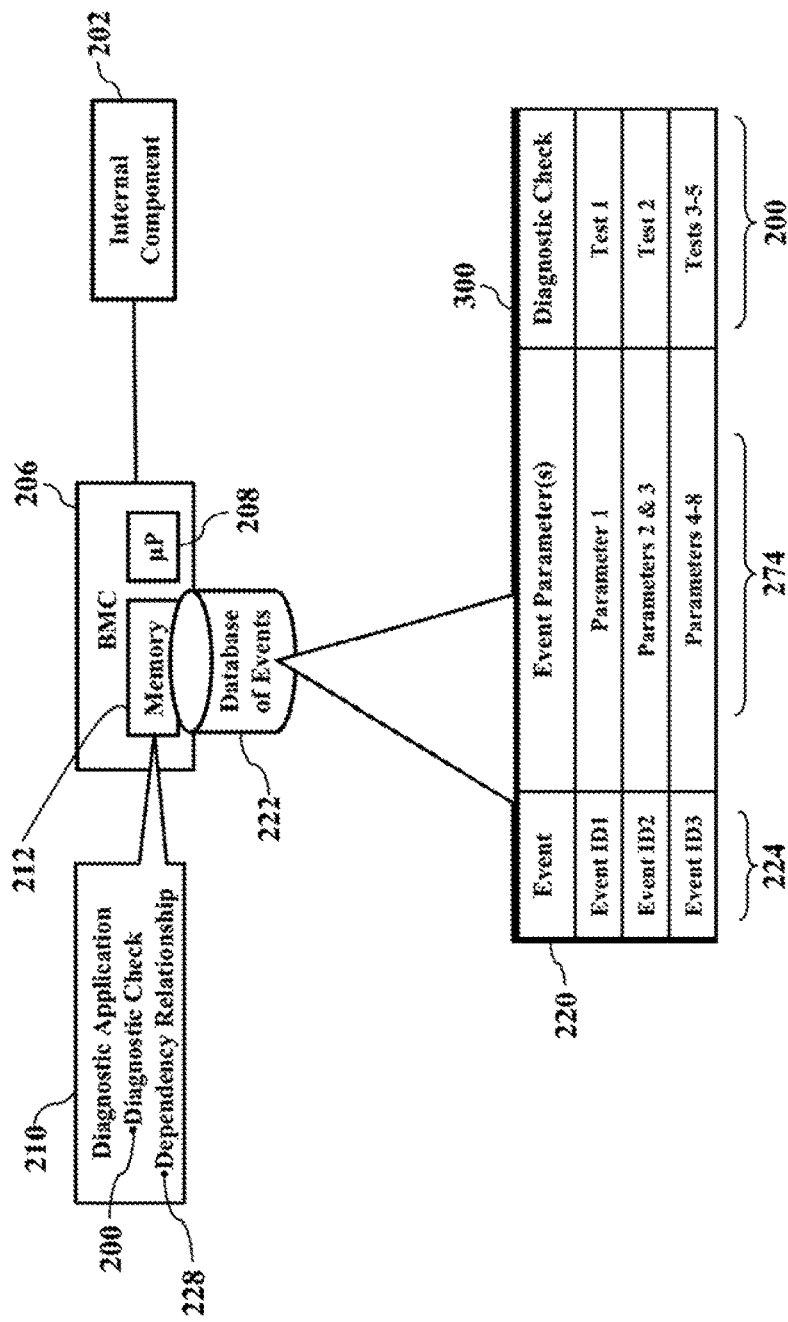

FIG. 11 further illustrates the database 222 of events. While the database 222 of events may have any structure, FIG. 11 illustrates the database 222 of events as a table 300 that electronically maps, relates, or associates the different events 224 to their corresponding event parameter(s) 274 and to the diagnostic check 200. Each event 224, in other words, is mapped to the event parameter(s) 274 that trigger execution. Moreover, the event 224 may also be electronically associated with the corresponding diagnostic check 200. Exemplary embodiments may thus define or specify different diagnostic tests, depending on the event 224 that triggers. As the reader may understand, each different internal hardware and/or software component 202 may have a dedicated or particular diagnostic check 200, as defined by the event 224. So, once the event 224 triggers, exemplary embodiments may query the database 222 of events for a match and identify or even retrieve the corresponding diagnostic check 200 that is executed. The diagnostic application 210 may then call or invoke the diagnostic check 200 that corresponds to the event 224. For simplicity, FIG. 11 illustrates the database 222 of events as being locally stored in the baseboard management controller 206, but some of the database entries may be dispersed to multiple other devices or locations within the communications network 218 (illustrated in FIGS. 1 and 9-10). While FIG. 11 only illustrates a few entries, in practice the database 222 of events may contain hundreds, thousands, or even millions of entries detailing many different events 224 and many different diagnostic checks 200.

Figure 12:
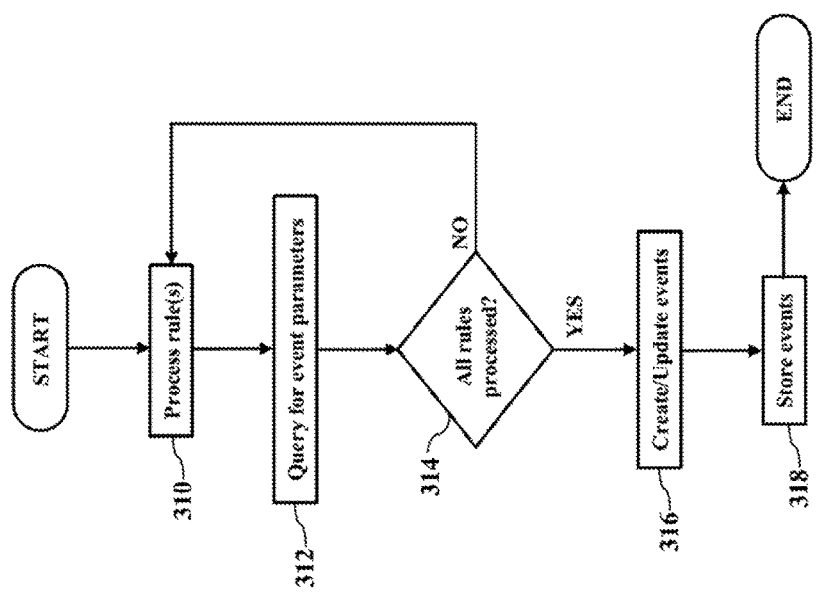

FIG. 12 illustrates a logical flowchart for creating and updating the event(s) 224 in the database 222 of events. Here again exemplary embodiments may use the artificial intelligence 250 to define the event(s) 224 that trigger when the diagnostic check 200 is performed. That is, the diagnostic application 210 executes the rules 232 to machine learn 252 when to conduct the diagnostic check 200. The rules 232 are sequentially, parallel, or batch processed (Block 310). The rules 232, for example, may instruct the baseboard management controller 206 to query for and/or receive the event parameters 274 (Block 312). If one or more rules 232 remain to be processed (Block 314), exemplary embodiments may continue processing the rules 232 to retrieve the most recent event parameters 274. However, if all the rules 232 have been processed (Block 314), the events 242 are created or updated (Block 316) and stored in the database 222 of events (Block 318).

Figure 13:
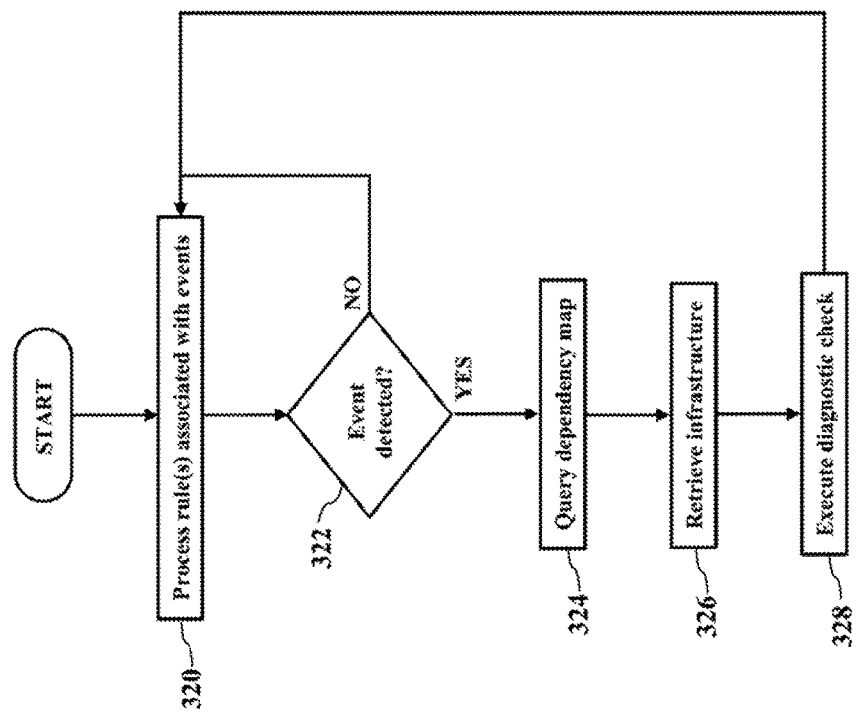
FIG. 13 illustrates a logical flowchart for triggering the diagnostic check, according to exemplary embodiments.

FIG. 13 illustrates a logical flowchart for triggering the diagnostic check 200, according to exemplary embodiments. Now that the dependency map 220 and the database 222 of events are created (as illustrated with reference to FIGS. 5-12), the diagnostic application 210 consults those component tools to execute the diagnostic check 200. The diagnostic application 210 may continuously execute the rule(s) 232 defining scheduling of the event(s) 224 stored in the database 222 of events (Block 320). When the event 224 triggers (Block 322) (perhaps at the date and time 280, as illustrated with reference to FIGS. 9-10), the diagnostic application 210 queries the dependency map 220 (Block 324) and identifies and/or retrieves the diagnostic infrastructure associated with the event 224 (Block 326). The diagnostic application 210, for example, may identify and/or retrieve the diagnostic data 226 and/or the dependency relationship 228 that is electronically associated with the event 224 (as explained with reference to FIG. 7). The diagnostic application 210 the executes the diagnostic check 200 (that corresponds to the event 224) (Block 328). The diagnostic application 210 may thus trigger the automated diagnostic check 200 on the internal hardware and/or software component 202 identified from the dependency map 220 and/or by the event 224. In plain words, then, exemplary embodiments provide a rules-based engine that consults the database 222 of events to determine when the diagnostic check 200 is performed. Once the event 224 triggers, exemplary embodiments may query the dependency map 220 for the corresponding diagnostic data 226. The rules-based engine then executes the diagnostic check 200 specified by the event 224.

Figure 14:
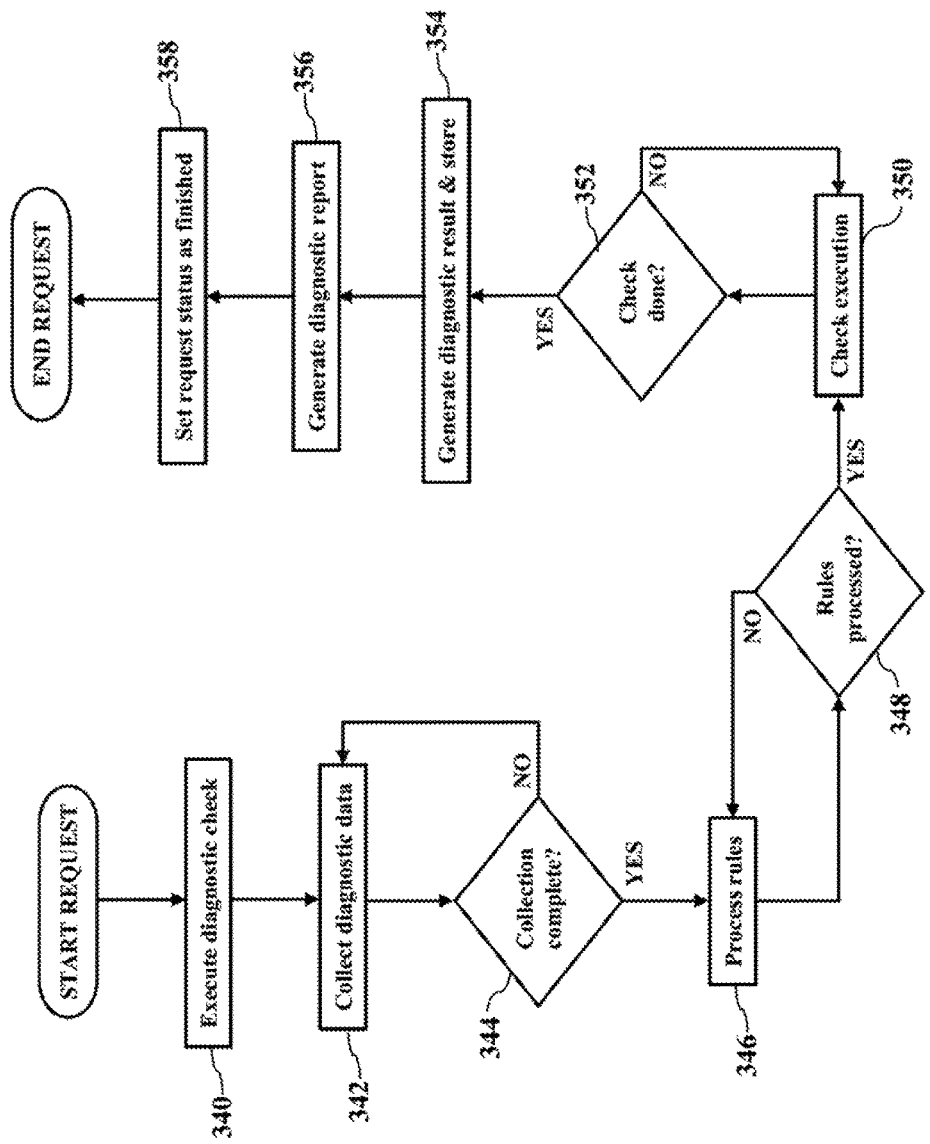
FIG. 14 illustrates a logical flowchart representing the automated diagnostic check, according to exemplary embodiments.

FIG. 14 illustrates a logical flowchart representing the automated diagnostic check 200, according to exemplary embodiments. When the diagnostic check 200 executes (Block 340) (as explained with reference to FIG. 13), the diagnostic data 226 is collected (Block 342). If the diagnostic data 226 remains to be collected (Block 344), the collection continues. However, if the diagnostic data 226 is completely collected (Block 344), exemplary embodiments process the rules 232 that correspond to the diagnostic check 200 (Block 346). Once the rules 232 are completed processed (Block 348), execution of the rules is checked (Block 350). If the check is complete (Block 352), the diagnostic result 234 is generated and stored in the database 236 of diagnostic checks (Block 354). The diagnostic report 238 is generated for local and/or remote notification and distribution (Block 356). The diagnostic application 210 may thus log or set the diagnostic check 200 as completed (Block 358).

Figure 15:
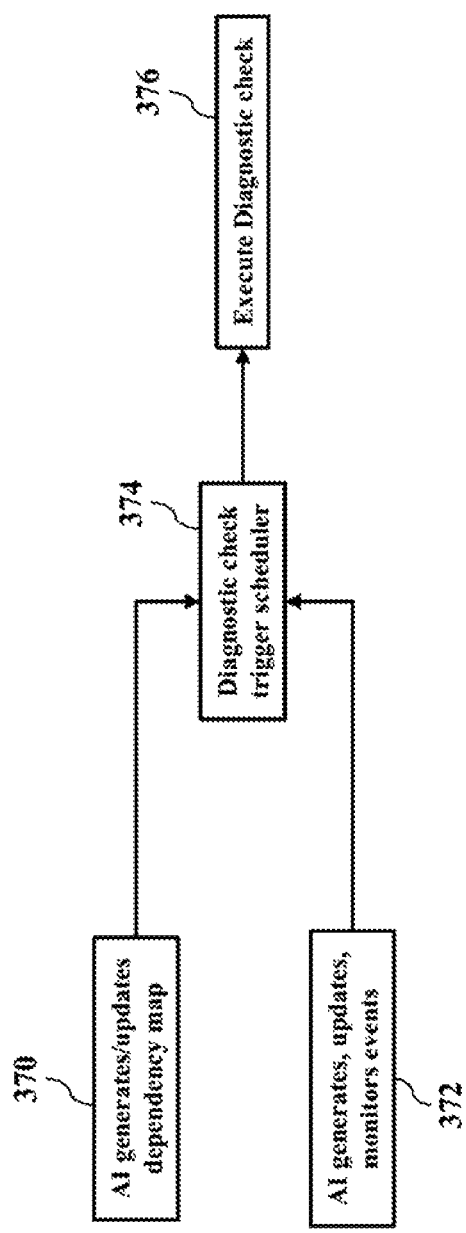
FIG. 15 also illustrates a logical flowchart representing the diagnostic check, according to exemplary embodiments.

FIG. 15 also illustrates a logical flowchart representing the diagnostic check 200, according to exemplary embodiments. Here, though, FIG. 15 illustrates a full solution. That is, exemplary embodiments create/update the dependency map 220 (Block 370). The creation and update of the dependency map 220 was previously explained with reference with FIGS. 1-7. Exemplary embodiments also create, update, and monitor the event(s) 224 stored in the database 222 of events (Block 372). The creation, updating, and monitoring of the events 224 was previously explained with reference with FIGS. 1-4 and 8-12. Exemplary embodiments thus monitor the events 224 to trigger execution of the diagnostic check 200 (Block 374), as explained with reference to FIG. 13. The diagnostic check 200 is then executed (Block 376), as explained with reference to FIG. 14.

Exemplary embodiments thus present an elegant, automated solution. Conventional approaches segment different auditing tools by operating system. Conventional approaches also acquire information manually from different sources (such as CMDB, Troux, DB's, Foglight) or direct from the servers, populate a spreadsheet (or several) and, by hand, produce a score for each item, using infinite number of KB's as rules/best practices sources. Exemplary embodiments, instead, utilize the artificial learning xx (perhaps based on the rules 232) to self-automate the diagnostic check 200. Exemplary embodiments are flexible by adding any kind of the diagnostic check 200, involving any device/service accessible through the network xx (Windows, Linux, Databases, Networking, Governance items, Monitoring solutions). Exemplary embodiments fully self-trigger and self-map based on the rules 232 driven end-to-end. Moreover, the diagnostic data 226 may be cross-referenced between servers belonging to the same layer (performing the same task), assuring that the configuration among them is the same.

Exemplary embodiments also reduce diagnostic times. Because the exemplary embodiments self-trigger and self-map, human time and manual effort is reduced and even eliminated. The diagnostic report 238, in other words, is generated and even standardized according to the infrastructure (such as the chassis component and/or the software application 210) tested. Exemplary embodiments may thus extract, evaluate, and report (perhaps via a user interface or dashboard) in a proactive fashion, like on holiday readiness effort, or reactive fashion, after any kind of related incident or even root cause analysis (RCA). As the reader may understand, RCA is an activity performed after major application/infrastructure/business issue occurred in production with an objective of finding the root cause. This RCA often exposes unidentified system-dependencies, and also these RCAs recommend doing extensive diagnostics by issuing out a problem known error (PKE) as a work item in the ITMS module. Exemplary embodiments may thus monitor for these work items recommending the extensive diagnostics and perform the diagnostics.

Exemplary embodiments may packetize. The IHS 100 and the baseboard management controller 206 may interface with the communications network 218 (such as the Internet). Messages and data may be packetized into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the World Wide Web), an intranet, the local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components.

Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for conducting a diagnostic check associated with a computer chassis, comprising:
    generating, by a baseboard management controller, using rule-based artificial intelligence, an event specifying when to conduct the diagnostic check;
    generating, by the baseboard management controller, using the rule-based artificial intelligence, a dependency map specifying diagnostic data that is electronically associated with the event;
    triggering, by the baseboard management controller, the diagnostic check based on the event generated using the rule-based artificial intelligence;
    retrieving, by the baseboard management controller, the diagnostic data that is electronically associated with the event; and
    executing, by the baseboard management controller, the diagnostic check of an internal component operating within the computer chassis, the internal component specified by the event, the internal component diagnostically checked according to the diagnostic data.

2. The method of claim 1, further comprising generating a diagnostic result of the diagnostic check.

3. The method of claim 2, further comprising logging the diagnostic result of the diagnostic check.

4. The method of claim 2, further comprising generating a notification of the diagnostic result of the diagnostic check.

5. The method of claim 1, further comprising identifying the diagnostic check in response to the event generated using the rule-based artificial intelligence.

6. The method of claim 1, further comprising querying the dependency map for the event generated using the rule-based artificial intelligence.

7. The method of claim 6, further comprising identifying the diagnostic data specified by the dependency map that is electronically associated with the event.

8. An information handling system, comprising:
    a baseboard management controller; and
    a memory device accessible to the baseboard management controller, the memory device storing instructions, the instructions when executed causing the baseboard management controller to perform operations, the operations including:
        generating, using rule-based artificial intelligence, an event specifying when to conduct a diagnostic check;
        generating, using the rule-based artificial intelligence, a dependency map specifying diagnostic data that is electronically associated with the event;
        triggering the diagnostic check based on the event generated using the rule-based artificial intelligence;
        retrieving the diagnostic data that is electronically associated with the event; and
        executing the diagnostic check of an internal component operating within a computer chassis housing the baseboard management controller, the internal component specified by the event, the internal component diagnostically checked according to the diagnostic data.

9. The system of claim 8, wherein the operations further comprise generating a diagnostic result of the diagnostic check.

10. The system of claim 9, wherein the operations further comprise logging the diagnostic result of the diagnostic check.

11. The system of claim 9, wherein the operations further comprise generating a notification of the diagnostic result of the diagnostic check.

12. The system of claim 8, wherein the operations further comprise identifying the diagnostic check in response to the event generated using the rule-based artificial intelligence.

13. The system of claim 8, wherein the operations further comprise querying the dependency map for the event generated using the rule-based artificial intelligence.

14. The system of claim 8, wherein the operations further comprise identifying the diagnostic data 22 specified by the dependency map that is electronically associated with the event.

15. A memory device storing instructions that when executed cause a baseboard management controller to perform operations, the operations comprising:
    generating, using rule-based artificial intelligence, an event associated with a diagnostic check of an internal component operating within a computer chassis;
    generating, using the rule-based artificial intelligence, a dependency map specifying diagnostic data that is electronically associated with the event;
    triggering the event generated using the rule-based artificial intelligence;

querying the dependency map in response to the triggering of the event, the dependency map electronically associating events to the diagnostic data and to diagnostic checks;

retrieving the diagnostic data from the dependency map that is electronically associated with the event;

identifying the diagnostic check of the diagnostic checks in the dependency map that is electronically associated with the event; and executing the diagnostic check of the internal component operating within the computer chassis according to the diagnostic data.

16. The memory device of claim 15, wherein the operations further comprise generating a diagnostic result of the diagnostic check.

17. The memory device of claim 16, wherein the operations further comprise logging the diagnostic result of the diagnostic check.

18. The memory device of claim 16, wherein the operations further comprise generating a notification of the diagnostic result of the diagnostic check.

19. The memory device of claim 15, wherein the operations further comprise determining a date and time at which the event triggers.

20. The memory device of claim 15, wherein the operations further comprise diagnostically testing a software application executed by the internal component operating within the computer chassis.

* * * * *

UNITED STATES PATENT AND TRADEMARK OFFICE
CERTIFICATE OF CORRECTION

PATENT NO. : 10,289,522 B2
APPLICATION NO. : 15/481035
DATED : May 14, 2019
INVENTOR(S) : Sathish Bikumala et al.

Page 1 of 1

It is certified that error appears in the above-identified patent and that said Letters Patent is hereby corrected as shown below:

In the Claims

Column 14, Line 54: Claim 5, Please change "data 22 specified" to --data specified--

Signed and Sealed this
Third Day of March, 2020

Andrei Iancu
*Director of the United States Patent and Trademark Office*